Figure 13:
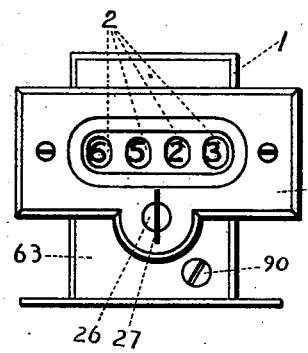

No. 714,054. Patented Nov. 18, 1902.
R. O. STEBBINS.
REGISTERING LOCK.
(Application filed Oct. 25, 1901.)
(No Model.) 2 Sheets—Sheet 1.
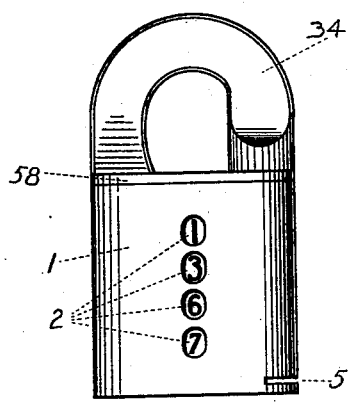
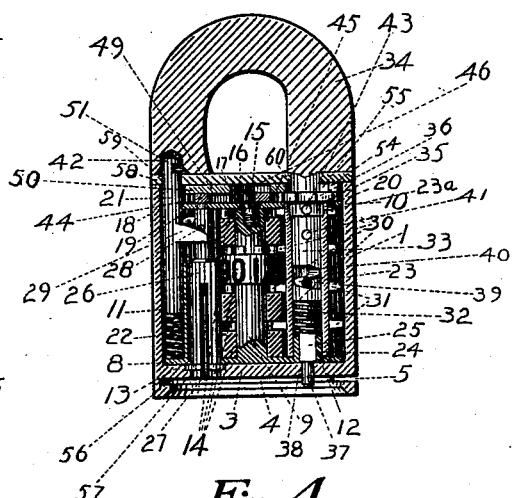
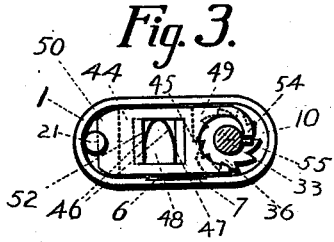
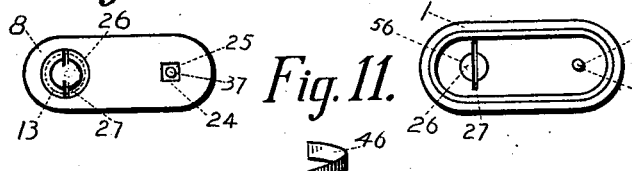
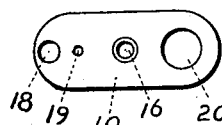
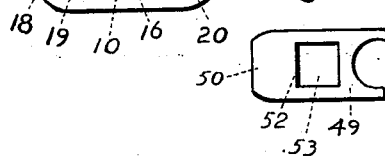
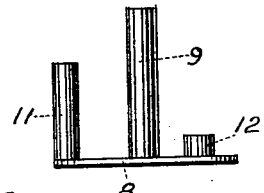
WITNESSES:
L. Lee.
Walter H. Talmage.
INVENTOR
Roswell O. Stebbins
BY
Thomas S. Crane
ATTORNEY
THE NORRIS PETERS CO., PHOTO-LITHO., WASHINGTON, D. C.

No. 714,054. Patented Nov. 18, 1902.
R. O. STEBBINS.
REGISTERING LOCK.
(Application filed Oct. 25, 1901.)

(No Model.) 2 Sheets—Sheet 2.

WITNESSES:
L. Lee.
Walter H. Talmage.

INVENTOR
Roswell O. Stebbins
By Thomas S. Crane, Atty

UNITED STATES PATENT OFFICE.

ROSWELL O. STEBBINS, OF NEW YORK, N. Y.

REGISTERING-LOCK.

SPECIFICATION forming part of Letters Patent No. 714,054, dated November 18, 1902.

Application filed October 25, 1901. Serial No. 79,917. (No model.)

*To all whom it may concern:*

Be it known that I, ROSWELL O. STEBBINS, a citizen of the United States, whose residence is No. 4 East Forty-third street, New York, county of New York, State of New York, have invented certain new and useful Improvements in Registering-Locks, fully described and represented in the following specification and the accompanying drawings, forming a part of the same.

The object of the present invention is to furnish a novel construction for the registering mechanism of locks which show by a visible index a different register-number each time that the lock is actuated and which afford by the record of such "register-number" an indication if the lock has been actuated in an unauthorized manner. My registering mechanism is constructed of very few parts and incapable of derangement. Its essential parts consist of a series of number wheels or disks having trundles in which, respectively, diverse numbers of pins are employed and a gear-shaft provided with gear-wheels having all the same number of teeth to mesh with such trundles, whereby the number-wheels are rotated at regular but diverse speeds. The number of indicating-figures upon each number-wheel corresponds to the number of pins in its trundle, so that the variation in the speeds of the number-wheels does not prevent the numbers from appearing regularly at the window for inspection each time that the gear-shaft is actuated. The gear-shaft is connected with a locking-piece which is actuated each time the shackle or bolt of the lock is moved, and the several dials thus exhibit a different series of figures or numbers after each actuation of the lock.
A self-locking bolt is used, so that a key is not required to lock the device, and a paper seal may therefore be applied to the keyhole and secured over the same by means operated when the device is locked.
My invention includes a pin forced into the seal to secure it over the keyhole and means actuated by the gear-shaft for projecting the pin.

The invention is applicable to any class of lock requiring a registering or sealing device, and the seal may be provided with inscriptions forming a baggage-check to show the route or destination of the object to which the seal and lock are attached.

Figures 14, 15:
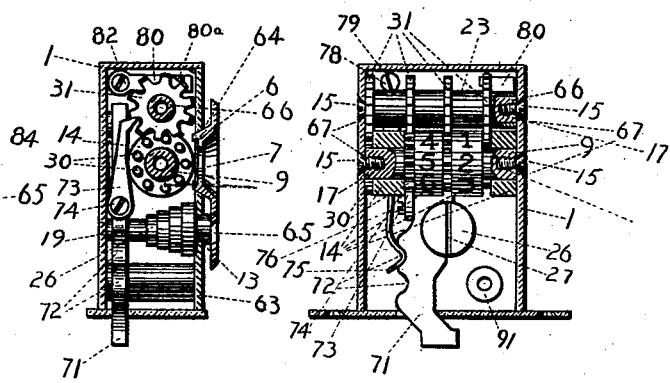
Figure 16:
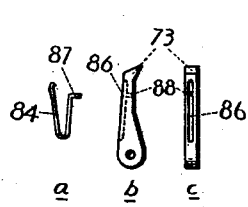
Figures 17, 18:
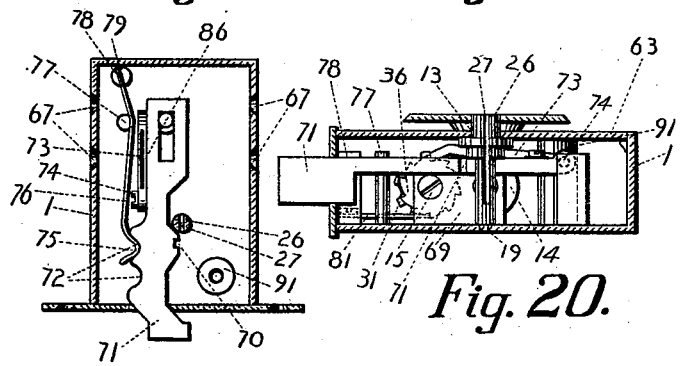
Figure 19:
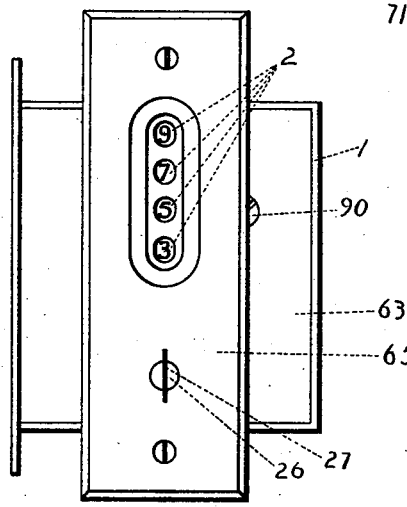
Figures 20, 21:
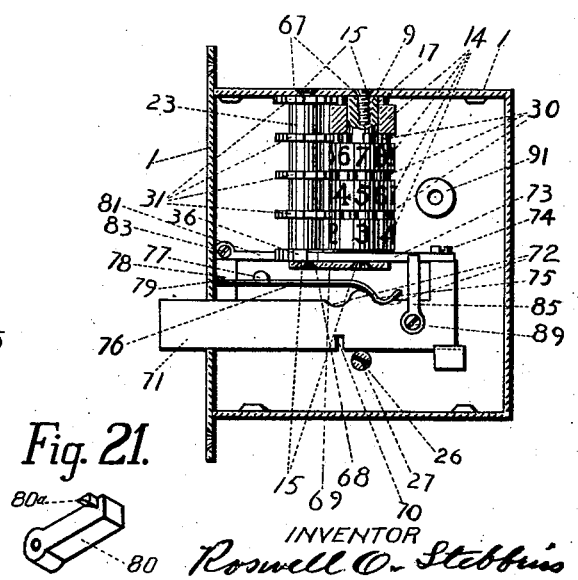

In the drawings, Figure 1 is an elevation of a padlock provided with the improvements; Fig. 2, a vertical section of the same where hatched upon the center line. Fig. 3 is a plan of the same with the shackle 34 and the top of the lock removed. Fig. 4 is a plan of the lock with the shackle 34 and the top of the lock removed as well as the ratchet, the trigger-pieces, the ratchet-wheel, and the top frame-plate 10. Fig. 5 shows the under side of the bottom plate. Fig. 6 shows the bottom of the padlock. Fig. 7 is a plan of the trigger-piece. Fig. 8 is a plan of the ratchet-piece. Fig. 9 is an elevation of the bottom frame-plate with the parts attached thereto, which are the tube 11 for the bolt, the spindle 9 for the number-wheels, and the boss on which the gear-shaft revolves. Fig. 10 is a plan of the top frame-plate. Fig. 11 is a perspective view of the spring for actuating the ratchet-piece and trigger-piece. Fig. 12 shows a combined check and seal, of paper or other suitable material. Figs. 13 to 17 illustrate a desk-lock. Fig. 13 is an elevation of the desk-lock provided with the registering device. Fig. 14 is a section of the same through the lock adjacent to the nearer side of the pawl 73, as represented in Fig. 15, which is a view of the interior of the same, the cover being removed and a few of the parts being shown in section at the center line where hatched. Fig. 16 embraces a view, lettered *a*, of the spring 84, and two views of the pawl 73, lettered, respectively, *b* and *c*. Fig. 17 is a view similar to Fig. 15, with the registering device removed to show the bolt and the key-arbor. Figs. 18, 19, and 20 illustrate a door-lock. Fig. 18 is an end elevation of the lock as viewed from the outer end, the parts where hatched being shown in section through the center of the key-arbor 26. Fig. 19 is an elevation of the door-lock. Fig. 20 is an elevation of the lock with the cover and guard-plate 65 removed and certain of the parts (where hatched) shown in section at the center line of the number-wheels, and Fig. 21 is a perspective view of the pawl 80.

I will first describe the construction of the padlock with its attachments.

The case 1, pierced by the oval windows or holes 2, Fig. 1, is formed with the bottom 3 raised, leaving the sides extended, Fig. 2. In each of the longer extended sides is cut a channel 4, and a slot 5 communicates therewith at one end, Figs. 1 and 2. Inside the case 1 and back of the oval holes 2 is cut a channel 6, having undercut edges, to which is fitted a piece of transparent isinglass or celluloid 7, Fig. 3. Inside the case 1 is fitted a frame having a bottom plate 8, a spindle 9, and a top plate 10, Figs. 2, 4, and 9. The bottom plate 8 is provided with a socket-tube 11, a spindle 9, a boss 12, and the hole 13, Figs. 2 and 9. The spindle 9 serves as an axle for the series of number-wheels 14, which are fitted to revolve thereon. The top frame-plate 10 is secured to the spindle 9 by the screw 15, passing through the countersunk hole 16 into the threaded hole 17 in the spindle 9, and is also pierced by the holes 16, 18, 19, and 20, Fig. 10. Into the socket-tube 11 is fitted the bolt 21, which extending through the hole 18 is normally pushed up by the compression-spring 22, Fig. 2. The boss 12, fitted to receive the end of the hollow gear-shaft 23, which revolves thereon, is pierced by the square hole 24, through which works the bolt 25, Figs. 2 and 5. To the hole 13 is fitted one end of the key-arbor 26, whose other end is fitted to the hole 19, so that the said key-arbor revolves in the holes 13 and 19 as bearings. The bottom 3 of the case is provided with recessed hole 56 to receive the shouldered end 57 of the arbor 26. The key-arbor 26 is provided with a suitable slot 27 to receive the key and pin 28, which bears on the inclined surface of a spur 29 extending from the bolt 21 and forces the said bolt into the socket-tube 11 when the arbor 26 is rotated, Figs. 2, 4, and 5. The number-wheels 14 have the registering numerals or figures on their outer cylindrical surface, as indicated, and the upper end of each is provided with a series of pins 30, arranged to mesh with toothed gear-wheels 31, formed on the hollow shaft 23, Figs. 2 and 4. The gear-wheels are of gradually-increasing diameter from one end to the other of the gear-shaft, but all have the same number of teeth, while the number-wheels 14 are provided with diverse numbers of pins, forming a series of odd or prime numbers, as "5," "7," "9," "11." The pins form a trundle or ring of teeth upon each number-wheel.

The numbers of indicating-figures upon the number-wheels 14 correspond in each case with the number of pins in the trundle of such wheel. The greater the number of pins the closer together the figures are set upon the periphery of the number-wheel; but the mechanism is constructed and operated to rotate the wheels at different speeds while maintaining a permanent connection with the gear-shaft, so that each of the numbers will always be turned in line with the row of windows. Upon the number-wheel having five pins the pins are set closer to the center than on the wheel having seven pins, and their pitch is thus adapted to that of the gear-wheels 31, whose pitch is necessarily increased where they are enlarged without increasing the number of their teeth. The gear-wheels are all shown with ten teeth, and one revolution of the gear-shaft would thus turn the number-wheel two revolutions where provided with five pins. The number-wheel with seven pins would at the same time be revolved one and three-sevenths times, the wheel with nine pins one and one-ninth times, and the wheel with eleven pins only ten-elevenths of a rotation. The series of four numbers presented at the holes or windows 2 is thus varied each time the shank of the shackle is turned when opening the padlock, and many hundreds of changes are produced before the original registration is repeated.

The hollow spindle 23 revolves (with the gear-wheels 31) upon the boss 12 on the frame-plate 8 and in the hole 20 in the top plate 10 as bearings, and is made hollow to receive the bolt 25, the compression-spring 32, and the cylindrical shank 33 of the shackle 34. The upper end of the hollow shaft 23 is provided with the recess 23$^a$ to receive the hub 35 of the ratchet-wheel 36, Figs. 2 and 4.

The bolt 25, fitted to the square hole 24, has its lower extremity reduced to the round pin 37, which works through the hole 38 in the bottom 3 of the case 1. The upper end of the bolt 25 is fitted to the hollow shaft 23 and formed with the cam-face 39, which works against the corresponding cam-face 40, formed on a cylindrical shank 33 of the shackle 34, against which it is held by the compression-spring 32, Fig. 2. The shackle has its cylindrical shank fitted into the hollow shaft and is secured thereto by the rivet 41, so as to revolve with the said hollow shaft. In the free end of the shackle is formed the hole 42 to receive the end of the bolt 21. (See Fig. 2.) The ratchet-wheel 36, formed with the hub 35, is fitted to the shank of the shackle and held in place by the rivet 43. On the upper surface of the top plate 10 and fitted to work between the parallel sides of the case 1 is the ratchet-piece 44, having the tooth 45 formed on one end and held against the ratchet-wheel 36 by the U-spring 46, bearing against the rear side of the square hole 48, Figs. 3 and 8. Sliding on top of the ratchet-piece 44 and between the parallel sides of the case 1 is the trigger-piece 49, formed, as shown in Fig. 7, with the end 50 fitted to a notch 51 in the end of the bolt 21 and held therein by the U-spring 46, bearing against the side 52 of the square hole 53, Fig. 3. On the trigger-piece 49 is formed the hooked end 54, against which bears a pin 55, fastened to and moving with the shank 33 of the shackle and operates when the shank is rotated to the right to withdraw the trigger-piece 49 from the notch 51.

To the case 1 is secured the cover 58, having the hole 59 for the bolt 21 and the hole 60 for the cylindrical shank 33 of the shackle.

The combination seal and check shown in Fig. 12 is cut out of paper or suitable material to fit the groove 4 in the extended sides of the case 1. In one end of the check 61 is formed the hole 62 at a point adapted to come directly over the pin 37 when the check is pushed to its proper place in the groove 4.

This lock is operated as follows: Having inserted the key in the slot 27, the rotation of the key in the proper direction (to the left) turns the key-arbor 26, with the pin 28 bearing on the inclined face of the spur 29. This spur is formed to partially embrace the key-arbor and has one end longer than the other, as indicated in Fig. 4, and is thus always in contact with one end of the pin 28. The pressure of the pin forces the bolt 21 down into the socket-tube 11, compresses the spring 22, and withdraws the end of the bolt 21 from the hole 42 in the shackle. This movement of the bolt brings the notch 51 on a line with the end 50 of the trigger-piece 49, which, moved by the spring 46, forces the end 50 into the notch 51 and holds the bolt 21 temporarily down. The key may now be removed. The shackle 34 being prevented by the ratchet-wheel 36 and the tooth 45 from turning in one direction and being free to revolve in the other direction, when it is revolved carries with it the hollow shaft 23, to which it is secured. The shaft 23, through the gear-wheels 31, formed thereon, and the pins 30 on the number-wheels 14, communicates the movement of the shackle to the series of number-wheels, causing them to rotate on the spindle 9 and presenting a different combination of numbers at each rotation to the line of oval holes 2 in the case. When the hollow shaft 23 is rotated, it presents a different portion of the cam-face 40 to the cam-face 39 on the upper end of the bolt 25 until it reaches a point where the bolt 25 is free to move in an upward direction. It is then forced up by the compression-spring 32 until the pin 37 is withdrawn into the hole 38 and no longer obstructs the plane of the channel 4. A check 61 may now be inserted in the channel 4, and the hole 62 will correspond with the pin 37. Such check may be marked, as shown in Fig. 12, with the station from which the object to which the lock is attached is sent and the station to which the said object is to be forwarded and also with the name of the company acting as the forwarding agents. The check is inserted through the slot 5 and moved along the channel 4, covering the key-slot 27 when the hole 62 coincides with the pin 37. The shackle 34 is then rotated to engage the bolt 21, and the cam-face 40, working against the cam-face 39, forces down the bolt 25 and presses the pin 37 into and through the hole 62 in the check 61, thus securing the check in place and sealing the lock. The bolt 25 is prevented from turning (when operated upon by the cam-face 40) by the square hole 24, to which the said bolt is fitted. Upon continuing the rotation of the shackle 34 to complete one revolution the pin 55 engages with the hooked end 54 of the trigger-piece 48, moving the said trigger-piece until the end 50 is freed from the notch 51. This occurs at the instant the hole 42 is directly over the bolt 21, and the bolt being free is then forced by the spring 22 into the hole 42, locking the shackle in place. The lock now contains a check showing the destination of the object to which the lock is attached. It is sealed, and the key hole or slot 27 cannot be reached without first destroying the seal, and the lock cannot be opened without changing the combination of numbers visible through the holes in the case.

As I contemplate the application of these devices to desk, door, vault, and box locks I have shown in Fig. 13 a desk-lock and in Fig. 19 a door or vault lock furnished with the registering device, and it will be obvious that the seal can also be applied to such locks.

In the locks shown in Figs. 13 and 19 the cases 1 are provided with the covers 63, having the holes 64, in which fit the depressed portions of the escutcheons 65, which are perforated by the holes 2, back of which extend the channels 6, having their edges undercut. To the said channels 6 are fitted transparent pieces of isinglass or celluloid 7. (See Fig. 14.) Such material suffices, as its destruction exposes only the numerals upon the number-wheels.

Inside the case 1 are fitted the spindles 9 and 66, secured to place by the screws 15, passing through the holes 67 in the sides of the case 1 and through holes 68 in the lug-piece 69 into the threaded holes 17 in the ends of the spindles, Figs. 14, 15, 18, and 20. On the spindles 9 are placed the series of number-wheels 14, and on the spindles 66 are placed the hollow shafts 23, having the gear-wheels 31 formed thereon and meshing with the pins 30 on the series of number-wheels, as previously described, Figs. 14, 15, 20.

The key-arbors 26 are provided with the slots 27 to receive keys which are adapted to bear on the faces of the notches 70, cut into the bolts 71, and thus move the bolts, Figs. 17 and 20. The bolts 71, formed with the notches 70, and the depressions 72 are provided with the pawls 73, pivoted on the screws 74. The depressions 72 receive the end 75 of the leaf-springs 76, which hold the bolts in position. The springs 76, kept under tension by the lugs 77, are secured to the cases by the lugs 78, split to hold the bent ends 79 of the spring.

The pawls 73, moved by and with the bolts 71, engage with the gear-wheels 31 in Fig. 14 and with the ratchet-wheel 36 in Fig. 20 and upon the movement of the bolt in one direction impart a rotary motion to the hollow shafts 23, which through the gear-wheels 31 and the pins 30 move the number-wheels 14 and change the combination of figures shown through the holes 2. Upon the return of the bolt the gear-wheels 31 are held in position by the spur 80ª on a pawl 80, Figs. 14, 15, and 21, and the leaf-spring 81 in Figs. 18 and 20. The spur 80ª on the pawl 80, secured to the case 1 by the screw 82, upon which the said pawl works, is held against the gear-wheel 31 by the force of gravity.

The leaf-spring 81, secured to the case 1 by the screw 83, has its free end adapted to engage with the ratchet-wheel 36 and permit the said ratchet-wheel to move in one direction only. The pawls 73 are held against the gear-wheels 31 and the ratchet-wheel 36, respectively, by the compression-spring 84 in Figs. 14 and 16ª and the leaf-spring 85 in Fig. 20. The spring 84, formed as shown in Fig. 16ª, is fitted to the groove 86 in the pawl 73 and is held in place by the bent end 87, inserted in the hole 88. (See Fig. 16ᵃᵇᶜ.) The leaf-spring 85 is secured to the bolt 71 by the screw 89, and its free end presses against the pawl 73. The covers 63 are secured to the cases 1 by the screws 90, fitted to the threaded holes in the lug-pieces 91.

In the drawings the teeth in the trundles of the several number-wheels and the pitch-circles of the teeth are graded from one end of the series to the other, and the gear-wheels as to their diameter are also graded in an opposite direction, while such gear-wheels have each the same number of teeth; but the number of changes in the position of the figures relative to the windows or holes 2 would be the same whatever the arrangement of the several number-wheels and the respective trundles upon their common spindle 9.

I am aware that in registering-locks "number-disks" similar to mine have been used with a plurality of projections irregularly arranged thereon, and "floating wheels" having shoulders to engage such projections; but in such a construction the floating wheels rotate independently of one another and the number-disks are not rotated simultaneously, but at such times only when the irregularly-disposed projections upon the disks happen to engage a tooth upon the floating wheel.

In my construction I use in place of independent floating wheels a series of gear-wheels fixed positively upon the same shaft and geared positively to the several "number-wheels," so that all the number-wheels are turned simultaneously by the gears upon the gear-shaft.

The variation in the indications is due to the diverse numbers of figures upon the peripheries of the number-wheels and their diverse ratios of rotation caused by the diversity of the number of pins in their respective trundles.

The movement of the number-wheels is more positive and certain when they are all revolved at each actuation of the lock by a series of positively-connected gear-wheels than where they are connected by independently-moving floating wheels, which are engaged only at intervals by irregularly-disposed projections upon the number-wheels, as such projections would fail to properly actuate the floating wheels if the floating wheel were accidentally displaced by any jar or shock. Such a disconnected mechanism does not operate like mine to hold all of the number-wheels in a fixed position during the locking of the device, so as to hold the numbers precisely opposite the windows provided for their inspection.

It will be noticed that the registering device is actuated by a connection with the locking-piece, as the shackle 34 in the padlock and the bolt 71 in the desk-lock or door-lock, so that the locking-piece cannot be moved without affecting the registering device and changing the combination of numbers which is visible at the window openings or holes 2. In the case of the padlock a direct connection exists between the shackle and the hollow shaft which carries the gear-wheels, while a pawl 73 is used to connect the bolt 71 with the hollow shaft in the case of the desk-lock or door-lock, as shown in Figs. 14 and 18.

I have found that where prime numbers are used for the numbers of teeth in one of the series (whether upon the gear-shaft or the number-wheels) the permutations are more numerous than otherwise, and where ten teeth are used upon each wheel of the gear-shaft and five, seven, nine, and eleven teeth are used upon the four number-wheels, respectively, two thousand permutations may be effected without a repetition of the initial arrangement of the figures. Such numbers of teeth are entirely practical in a construction of small size, such as is required in a lock, and the permutation device thus constructed is exceedingly simple and cheap and consists of few parts, and is thus of a most durable character.

The number of figures upon the several number-wheels differs in the same proportion as their speeds of rotation, the wheel which rotates most slowly having fewer figures upon it than the others, and the successive registering numbers which are presented to view at the window and the lock-case are not therefore in any regular order or sequence.

I am aware that it is common to secure a seal upon a lock by means of a moving pin or bolt; but my claim herein is not for the mere use of a pin or bolt to secure the seal, but to the particular construction and arrangement of the cam 40 and the pin 37 within the hollow gear-shaft, in which the shank 33 of the shackle is rotated when the lock is actuated.

Having thus set forth the nature of the invention, what is claimed herein is—

1. In a registering-lock, the combination, with a case having a row of holes or windows, of the spindle 9 having the series of number-wheels 14 movable independently thereon in line with such windows, and provided respectively with trundles to turn the same, a locking-piece, the gear-shaft 23 connected with such locking-piece and arranged parallel with the number-wheels and having the series of gear-wheels 31 attached to the shaft, and in permanent connection with the trundles to rotate all of the number-wheels simultaneously, the number of teeth in the gear-wheels and pins in the trundles having a progressive ratio as set forth, to vary the speeds of the several number-wheels progressively throughout the series, and the number of figures upon each number-wheel being in proportion to its speed of rotation relative to the rotation of the gear-shaft, whereby certain figures upon the several number-wheels are brought to the centers of the windows at each rotation of such shaft.

2. In a registering-lock, the combination, with a case having a row of holes or windows, of the spindle 9 having the series of number-wheels 14 movable independently thereon in line with such windows and having trundles to turn the same, the numbers of pins in the respective trundles forming a progressive series and their pitch-circles varying correspondingly, and the periphery of each number-wheel having a series of figures corresponding in number to the pins in its trundle, a locking-piece, the gear-shaft 23 connected with such locking-piece and arranged parallel with the number-wheels, and a series of gear-wheels 31 attached to the shaft and having each the same number of teeth and their pitch-circles graded in diameter from one end of the series to the other, and the teeth in such wheels engaged permanently with the pins of the diverse trundles, and the trundles and gear-wheels being disposed to bring the figures upon the several number-wheels in line with the series of windows, substantially as herein set forth.

3. In a registering-lock, the combination, with the case having the key-slot 27, and the groove 4 forming a channel to apply a seal 61 over such key-slot, of the registering mechanism having the spindle 9 with series of number-wheels 14 thereon, and the hollow gear-shaft 23 with gears for rotating such number-wheels as set forth, the shackle 34 rotatable on shank 33 in the hollow gear-shaft, a locking-piece with connection to the shackle for reciprocating the same when the shackle is turned, and means connected to the locking-piece for actuating the registering mechanism, the pin 37 movable in the gear-shaft, and the cam 40 actuated by the shank of the shackle for projecting the pin into the seal to secure it in the said channel, substantially as herein set forth.

In testimony whereof I have hereunto set my hand in the presence of two subscribing witnesses.

ROSWELL O. STEBBINS.

Witnesses:
WALTER H. TALMAGE,
THOMAS S. CRANE.